INVENTOR.
ALBERT H. ASHLEY

BY Spencer E. Olson

ATTORNEY.

May 9, 1967 A. H. ASHLEY 3,319,081

CURRENT SWITCHING CIRCUIT

Filed April 13, 1964 2 Sheets-Sheet 2

INVENTOR.
ALBERT H. ASHLEY

BY [signature]

ATTORNEY.

3,319,081

CURRENT SWITCHING CIRCUIT

Albert H. Ashley, Holliston, Mass., assignor to Sylvania Electric Products, Inc., a corporation of Delaware Filed Apr. 13, 1964, Ser. No. 359,523
6 Claims. (Cl. 307—88.5)

This invention relates generally to electronic circuits and more particularly to an improved current switching circuit.

Many systems require circuits which alternately pass current through two or more loads under the control of a trigger circuit, and with the advent of more complex systems wherein space requirements and power consumption become increasingly important, it is necessary that such circuits operate with maximum efficiency and reliability. A typical application of a current switching circuit is the write driver circuit used in a system for recording binary data on magnetic tape. In this application the circuit allows current to flow first through one-half of a write coil of a recording transducer and then through the other half. The write coil is so wound that a magnetic tape moving past the coil is magnetized first in one direction and then in the opposite direction as the current is switched from one-half of the write coil to the other. This technique is used to record binary information on magnetic tape, with a change in the direction of the magnetization of the tape being representative of a binary "one" and no change in the direction of magnetization of the tape representing a binary "zero." In the event that no binary information is being received, the switching circuit must be operative to insure that no current passes through either half of the write coil.

A typical prior art switching circuit used as a write driver circuit is illustrated in FIGS. 11.2–1 and 11.2–2 at pages C82 and C84 of volume II of the "IBM Customer Engineering Manual of Instruction for the 7090 Data Processing System." The control portion of the circuit, denoted as the "write trigger," is shown in FIG. 11.2–1 and the driver part of the circuit is shown in FIG. 11.2–2. While this circuit operates satisfactorily in some applications, it has inherent disadvantages. Since the collector electrode of the write status transistor $T_4$ of the driver circuit is connected directly to the emitter electrodes of transistors $T_1$ and $T_2$, the transistor $T_4$ must carry the full write current of either transistor $T_1$ or $T_2$, thus requiring transistors $T_4$ to have a high current carrying capability, which makes it impractical for transistor $T_4$ to control more than one pair of write drive transistors. Also, the base electrodes of transistors $T_1$ and $T_2$ of the drive circuit are capacitively coupled to the base electrodes of transistors $T_1$ and $T_2$ of the write trigger circuit, with the result that when transistor $T_4$ of the drive circuit is turned on (i.e., becomes conducting) a transient may be put back into the write trigger circuit which causes the write trigger circuit to change its state, thereby inducing an error into the recorded data. The write trigger portion of the circuit requires four transistors to control the driver portion of the circuit.

Therefore, it is a principal object of this invention to provide a current switching circuit of economical design requiring a minimum of power consumption.

It is a further object of this invention to provide a current switching circuit that is relatively unsusceptible to turn-on and turn-off transient currents.

Still another object of the invention is to provide a current switching circuit wherein the control transistors are capable of controlling more than one pair of drive transistors.

These and other related objects are accomplished in a preferred embodiment of the invention by utilizing a hybrid configuration which employs NPN transistors in the driving circuit and PNP transistors in the flip-flop trigger circuit, thereby permitting complete control of the driving transistors at their respective base electrodes. As a result, the control transistor of the driving circuit operates as a modified emitter follower and is not required to pass the full drive current. Furthermore, this configuration, by having the emitter electrode rather than the collector electrode of the trigger transistor connected to the base electrode of its respective drive transistor, provides almost complete isolation of the triggering circuit from transient voltages which result when switching occurs between the drive transistors.

A better understanding of the construction and operation of the invention will become apparent from the following detailed description taken in conjunction with the accompanying drawings, in which.

Figure 1:
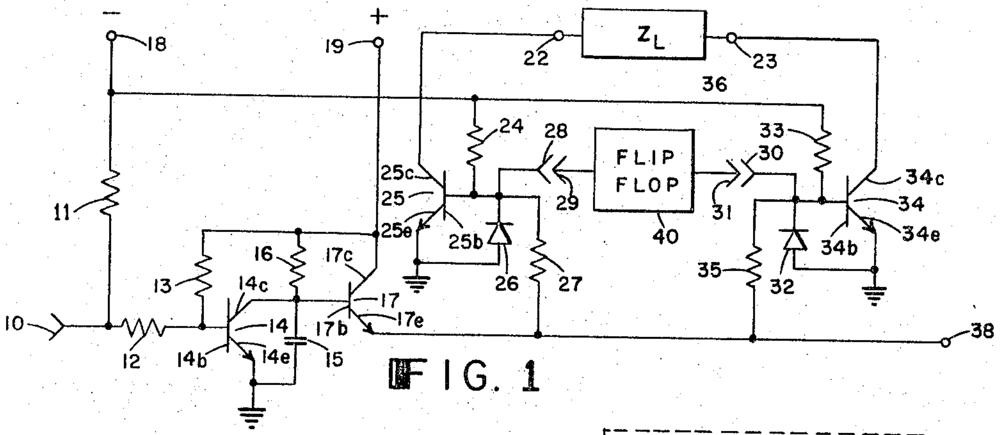
FIG. 1 is a schematic circuit diagram of a current switching circuit embodying the invention.

Referring now to FIG. 1, the current switching circuit according to the invention may be characterized as including sub-circuits which provide a write control function, a current driving function and a trigger function. The write control sub-circuit includes an input terminal 10 connected via resistor 12 to the base electrode of transistor 14, and via resistor terminal 11 to a source of negative potential represented by terminal 18. The base electrode of transistor 14 is additionally connected via resistor 13 to a suitable source of positive potential, represented by terminal 19, and the emitter electrode 14*e* is connected directly to ground. The collector electrode of transistor 14 is connected directly to the base electrode of a second transistor 17 and through resistor 16 to the aforementioned source of positive potential represented by terminal 19, the positive potential also being applied directly to the collector electrode of transistor 17. A capacitor 15 is connected between the collector electrode of transistor 14 and ground. The emitter electrode of transistor 17 is connected via resistors 27 and 35 to the base electrodes 25*b* and 34*b* of transistors 25 and 34, respectively, in the current driving sub-circuit. In addition the emitter electrode of transistor 17 is connected to a terminal 38 which may be, in turn, suitably connected to the base electrodes of an additional pair of current driving transistors.

The write control sub-circuit regulates the circuit operation to prevent the flow of current through the drive transistors when no binary information is received, or to permit the flow of current through the drive transistors when binary information is to be recorded. In the non-writing condition, the input terminal 10 is grounded by appropriate means (not shown) thereby removing the negative bias at the base of transistor 14. Transistor 14 conducts full current and the collector of transistor 14 is held at approximately ground potential, causing transistor 17 to be non-conducting, thereby preventing the flow of current to the base electrodes of transistors 25 and 34. In the write condition, input terminal 10 is effectively open-circuited and transistor 14 is non-conducting. As a result, the base of transistor 17 is at some positive potential and transistor 17 saturates placing its emitter electrode at a potential approximately equal to the energizing potential represented by terminal 19, thereby proproviding a source of positive current for the base electrodes of transistors 25 and 34.

The current driving sub-circuit has the collector electrodes of transistors 25 and 34 connected directly to terminals 22 and 23, respectively, of a suitable load 36. The emitter electrodes of transistors 25 and 34 are directly connected to a point of ground potential. The base electrodes of transistors 25 and 34 are connected to the aforementioned negative source of potential represented by terminal 18 via resistors 24 and 33, respectively. In addition, the base electrodes of transistors 25 and 34 are connected to a point of ground potential via diodes 26 and 32, respectively. Furthermore, the base electrodes of transistors 25 and 34 are directly connected to terminals 28 and 30, respectively, which terminals are directly connected to the output terminals 29 and 31 of the trigger circuit 40.

Figure 1A:
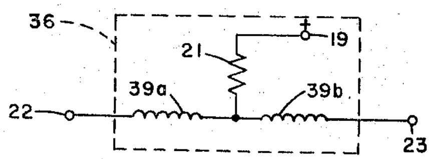
FIG. 1A is a schematic representation of a typical load $Z_L$ shown in block diagram form in FIG. 1.
Figure 1B:
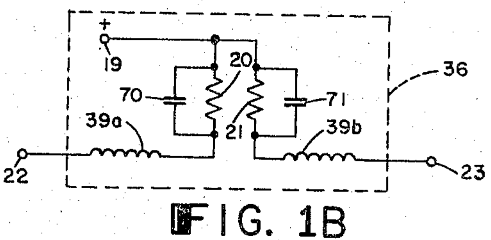
FIG. 1B is a schematic representation of an alternative load $Z_L$ shown in block diagram form in FIG. 1.

Referring next to FIG. 1A, the load 36 of the preferred embodiment consists of a write coil 39 connected between terminals 22 and 23, and the center tap of the write coil is connected via resistor 21 to the aforementioned source of positive potential represented by terminal 19. An alternative load is shown in FIG. 1B. In the alternative load circuit one half of the write coil **39*a* is connected at one end to terminal 22, and the other end is connected via a resistor 20 to the aforementioned source of positive potential 19. In a similar manner the second half of the write coil 39*b* has one end connected to terminal 23 and the other end connected via resistor 21 to the source of positive potential. In addition, capacitors 70 and 71 are connected in parallel with resistors 20 and 21**, respectively.

When the write control transistor 17 is non-conducting, transistors 25 and 34 will also be non-conducting because of the negative potential at the base electrodes of the respective transistors applied via resistors 24 and 33, respectively, which back-biases the base-to-emitter junction of these transistors. However, when the write status transistor 17 is conducting, the emitter electrode of transistor 17 is at some positive potential roughly equivalent to the source of positive potential represented by terminal 19, such that base of transistor 25 or 34 will be at some positive potential depending upon the state of flip-flop 40. Furthermore, as flip-flop 40 changes state, the drive transistors 25 and 34 will likewise change state; i.e., go from conducting to non-conducting or from non-conducting to conducting, such that the current will alternately be passed through write coil **39*a* and 39*b***.

Figure 2:
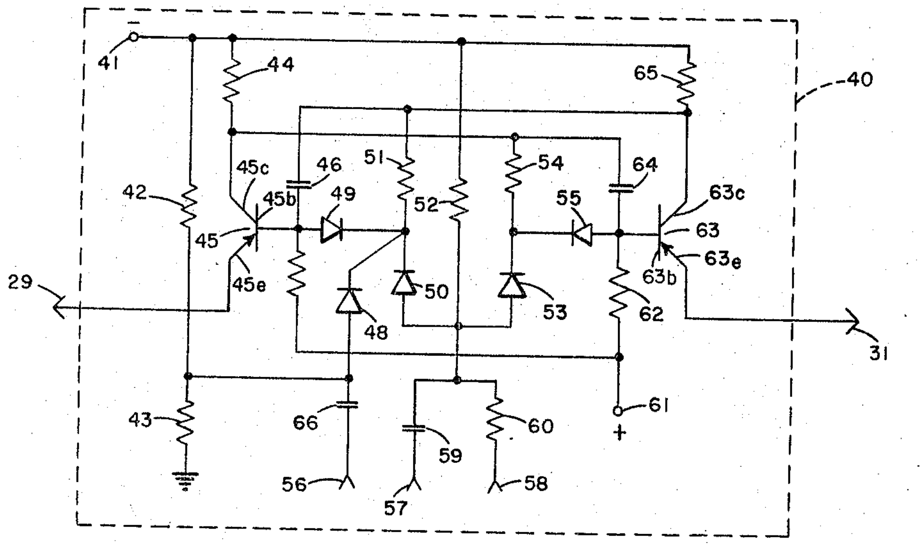
FIG. 2 is a schematic circuit diagram of the flip-flop shown in block diagram form in FIG. 1.

Referring next to FIG. 2, the trigger circuit 40 of FIG. 1 is shown in schematic form and is recognized as a modified gated complemented flip-flop circuit. The flip-flop has an input terminal 58 connected via resistor 60 to the junction of diodes 50 and 53, this junction being in turn connected via resistor 52 to a source of negative potential represented by terminal 41. A second input terminal 57 is connected via capacitor 59 to the above-mentioned diode junction. The anode of diode 50 is connected to a point to which are also connected the anodes of diodes 48 and 49. The cathode of diode 49 is directly connected to the base electrode of transistor 45. The anode of diode 53 is connected directly to the anode of diode 55, with the cathode of diode 55 connected to the base electrode of transistor 63. Resistors 47 and 62 are connected between the base electrodes of electrodes of transistors 45 and 63, respectively, and a source of positive potential represented by terminal 61. The anodes of diodes 53 and 55 are connected via resistor 54 to the collector electrode of transistor 45, and in a similar fashion the junction common to the anodes of diodes 48, 49 and 50 is connected via resistor 51 to the collector electrode of transistor 63. The base electrode of transistor 63 is connected via capacitor 64 to the collector of transistor 45 and the base electrode of transistor 45 is connected via capacitor 46 to the collector electrode of transistor 63. The collector electrodes **45*c* and 63*c* are connected via resistors 44 and 65, respectively, to the aforementioned source of negative potential represented by terminal 41. A third input terminal 56 is connected through capacitor 66 to the cathode of diode 48, which, in turn, is directly connected to the junction of resistors 42 and 43 which form a resistive bias network connected between the above-mentioned source of negative potential represented by terminal 41 and a point of ground potential. The emitter electrodes of transistor 63 and 45 are directly connected to output terminals 31 and 29**, respectively.

The flip-flop 40 is designed primarily for use in a synchronous system. Therefore, clock pulses are applied to input terminal 57 and data pulses are applied to input terminal 58, the requirement being that to change state the flip-flop must receive simultaneous signals on input terminals 57 and 58. As required, signals are applied to input terminal 56 to reset the flip-flop so that at the beginning of any recording the state of the flip-flop is known. As the state of the flip-flop changes, current is alternately drawn through transistor 45 or transistor 63 thereby alternately providing a source of negative potential via terminals 29 and 31, respectively, to the base electrodes of transistors 25 and 34 in the current driving sub-circuit.

In summary, it is noted that the operation of the write driver circuit described above depends upon the co-action of the write control, current driving and trigger sub-circuits. The conducting or non-conducting state of transistors 25 and 34 determine through which half of write coil 39 current passes. In turn, whether transistor 25 or 34 is conducting depends upon the state of the flip-flop control sub-circuit 40, assuming that transistor 17 is conducting. For example, with transistor 17 conducting, a source of positive current is applied via resistors 27 and 35, respectively, to the base electrodes of transistors 25 and 34. If transistor 45 of the trigger circuit is conducting and transistor 63 is non-conducting, the base electrode of transistor 25 is at some negative potential. As a result, its base-to-emitter junction is back biased and transistor 25 is non-conducting. At the same time, the base-to-emitter junction of transistor 34 is forward biased so that transistor 34 is conducting full current, which current passes through write coil **39*b*. When the next data pulse is applied in coincidence with a clocking pulse to terminals 57 and 58, the trigger flip-flop changes state thereby rendering transistor 63 conducting and 45 non-conducting. This, in turn, forces the base of transistor 34 to some slightly negative potential thereby back-biasing the base-to-emitter junction and turning off transistor 34. At the same time, the base of transistor 25 rises to some positive potential, thereby forward-biasing its base-to-emitter junction, causing the transistor to conduct full current through coil 39*a***.

A circuit which has been successfully operated had the following component values and commercial identities:

| | | |
|---|---|---|
| Resistors **11** and **12** | ohms | 3K |
| Resistor **13** | do | 8.2K |
| Resistor **16** | do | 1K |
| Resistor **21** | do | 170 |
| Resistors **24** and **33** | do | 6.8K |
| Resistors **27** and **35** | do | 1.5K |
| Resistors **42** and **52** | do | 12K |
| Resistors **43** and **60** | do | 1.2K |
| Resistors **44** and **65** | do | 1.6K |
| Resistors **47** and **62** | do | 13K |
| Resistors **51** and **54** | do | 2.4K |
| Capacitor **15** | pfd | 390 |
| Capacitors **46** and **64** | pfd | 300 |
| Capacitors **59** and **66** | pfd | 150 |
| Diodes **26**, **32**, **48**, **49**, **50**, **53** and **55** | | 1N276 |
| Transistors **14**, **17**, **25** and **34** | | 2N2719 |
| Transistors **45** and **63** | | 2N964A |
| Potential at terminals **18** and **41** | volts | —12 |
| Potential at terminals **19** and **61** | do | +12 |
| Coil **39** | μh | 300 |

This circuit was designed for operation as a write driver circuit in a system for recording binary data on magnetic tape wherein the previously described method of magnetizing the tape is used to record a binary "one" or a binary "zero."

Figure 3:
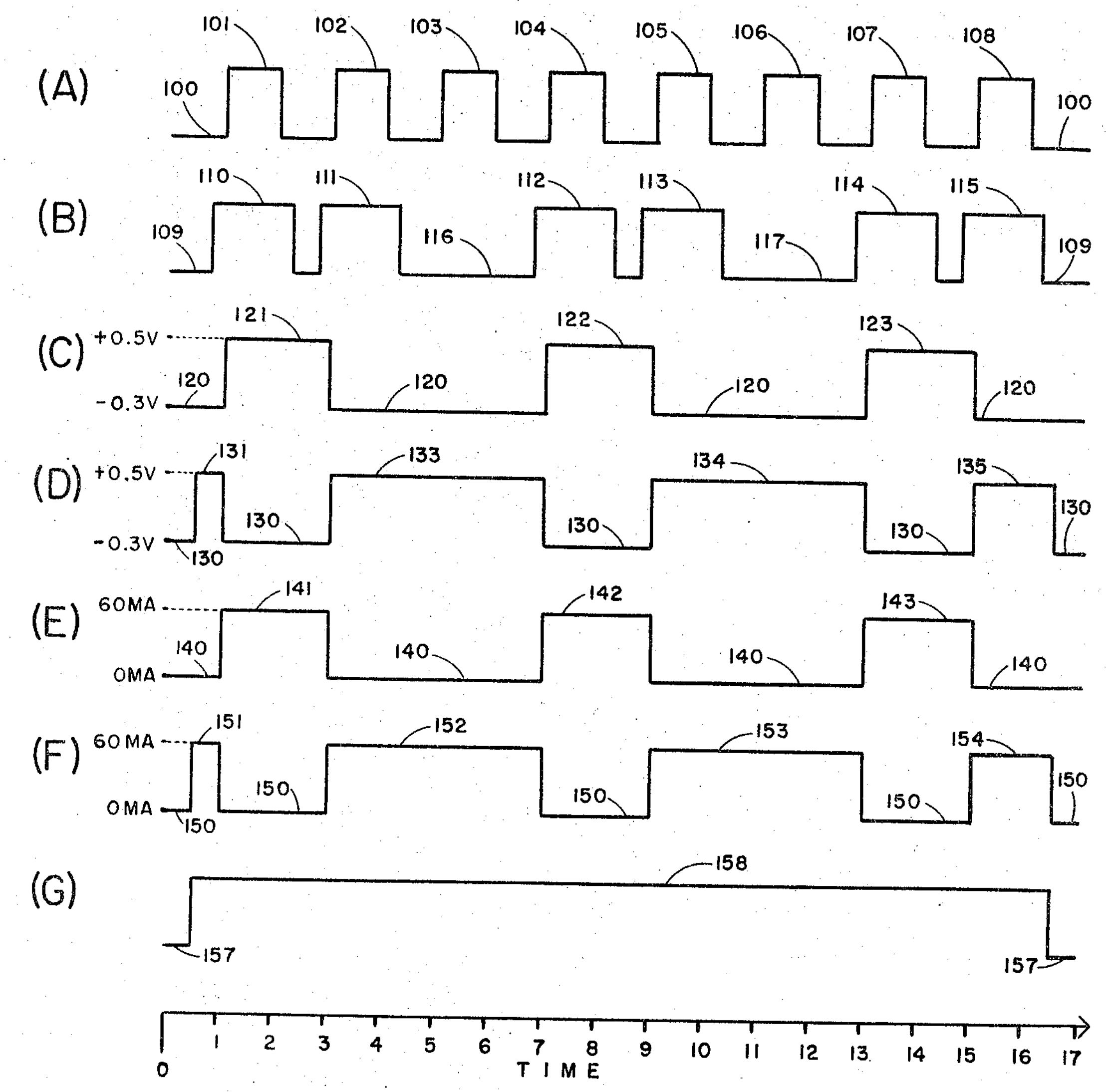
FIG. 3 is a series of waveforms representing typical signal levels generated within one embodiment of the invention in recording the binary number 11011011.

The operation of the invention will be better understood from the following detailed description and reference to FIG. 3, illustrating the operational steps required to record the binary equivalent of the number 219, namely 11011011. The signals on line A of FIG. 3 represent periodic clocking pulses 101 through 108, which are derived from a suitable pulse generator. The clocking pulses are applied to input terminal 57 of the flip-flop 40, and determine when the circuit is capable of being triggered. The signals on line B of FIG. 3 represents data pulses, indicating the presence of binary "ones," which may result from a computer readout, a card readout or some similar data producing device. The data pulses are applied to input terminal 58 of the flip-flop, it being recognized that the absence of a data pulse at a time when a clocking pulse is received is representative of a binary "zero."

The signals on lines C and D represent the voltage potentials at the emitter electrodes of transistors 45 and 63, respectively, as a function of time. It is noted that the same potentials are applied to the base electrodes of transistors 25 and 34, respectively. The signals on lines E and F represent, as a function of time, the current levels present in transistors 25 and 34, respectively. The signal on line G represents the potential, as a function of time, at the emitter electrode of transistor 17. As noted previously, when input terminal 10 is grounded, the potential 157 of the emitter of transistor 17 is at approximately ground potential, whereas when input terminal 10 is effectively open-circuited, the potential at the emitter of transistor 17 is at some positive potential as represented by signal level 158.

Just prior to the initiation of the recording of the binary equivalent of the number 219 it is assumed that transistor 45 is conducting and transistor 63 is non-conducting. This condition may be assured by applying a suitable reset pulse to input terminal 56. It is further assumed that input terminal 10 is grounded so transistor 17 is non-conducting. Transistors 25 and 34 are non-conducting because of the negative potentials, approximately −0.3 volt, applied via resistors 24 and 33 to the respective base electrodes, thereby back-biasing the base-to-emitter junctions of these transistors. Now, after one-half an interval of time, a write command signal is applied to terminal 10; i.e., terminal 10 is open-circuited, cutting off transistor 14 and driving transistor 17 into conduction. Therefore, the potential at the emitter of transistor 17 rises to approximately +12 volts indicated by signal level 158 resulting in the potential 131 at the base electrode of transistor 34 to rise to +0.5 volt and transistor 34 goes into full conduction as indicated by current level 151. Transistor 25 remains cut off because of the current through diode 26 and transistor 45.

Just prior to the first interval of time, the first data level 110 is applied to input terminal 58 and shortly thereafter the first clock pulse 101 is applied to input terminal 57. This causes the flip-flop 40 to change state so transistor 63 conducts and transistor 45 is cut off, resulting in a potential 121 of +0.5 volt at the base electrode **25*b* and a potential 132 of −0.3 volt at the base electrode 34*b*, causing transistor 25 to conduct and transistor 34 to be cut off, as indicated by current signal levels 141 and 150**, respectively.

After three intervals of time the second clock pulse 102 is applied to input terminal 57 and since the second data level 110 was applied to input terminal 58 just prior to the reception of the second clock pulse 102, the flip-flop 40 once again changes state, thereby causing transistor 63 to cut off. The resultant potential 133 at the base electrode **34*b* rises to +0.5 volt, thereby driving transistor into full conduction as indicated by the current signal level 152. Simultaneously, transistor 45 conducts current causing the potential 120 at the base electrode 25*b* to drop to −0.3 volt thereby cutting off transistor 25 as indicated by signal level 140**.

When the third clock pulse 103 is applied to input terminal 57 there is no data pulse applied to input terminal 58. Therefore, the flip-flop does not change state and as a result the transistors 25 and 34 are not affected.

In a manner similar to that described above, the remaining clock pulses and data pulses are sequentially applied to input terminals 57 and 58, respectively, until all the data has been duly recorded. After sixteen and a half time intervals, the write command signal is removed from input terminal 10 and the potential 157 at the emitter electrode **17*e* of transistor 17 goes to approximately zero volts (ground). Therefore, the potential 130 at the base electrode 34*b* of transistor 34 becomes approximately −0.3 volt causing transistor 34 to cut off as indicated by current signal level 150**.

From the foregoing description it is appreciated that transient voltages occurring during the switching of the drive transistors cannot change the state of the triggering flip-flop since the base electrodes of the transistors in the triggering flip-flop are completely isolated from the drive transistors and the emitter electrodes of the transistors in the triggering flip-flop are relatively unaffected by such transients, whereas in prior art circuits there is a direct capacitive coupling between the drive transistors and the base electrodes of the triggering flip-flop. Also, as previously pointed out, since the current drive transistors are completely controlled at their respective base electrodes, the amount of current the write control transistor is required to carry is significantly less than the full load current.

While the foregoing description has illustrated one preferred embodiment of the invention, it will be readily obvious to ones skilled in the art that minor variations may be made without departing from the spirit of the invention. For example, the basic hybrid configuration can be kept by replacing the NPN transistors with PNP transistors and the PNP transistors with NPN transistors. Additionally, in some applications it is desirable to provide separate load resistors 20 and 21 for each half of the write coil **39*a* and 39*b*, respectively, as shown in FIG. 1B. Using this configuration, capacitors 70 and 71 may be connected in parallel with resistors 20 and 21** to improve the rise time of the resultant signals. It is, therefore, intended that the invention not be limited to the specifics of the preceding description of one preferred embodiment, but rather to embrace the full scope of the following claims.

What is claimed is:

1. A current switching circuit for use with a bistable flip-flop circuit including at least two transistors, each having at least an emitter electrode, and wherein the emitter electrode of the first flip-flop transistor is connected to a first flip-flop output terminal and the emitter electrode of the second flip-flop transistor is connected to a second flip-flop output terminal, said current switching circuit comprising: a first and second transistors each having base, emitter and collector electrodes; an input terminal; first and second sources of energizing potential; a first resistor connected between said input terminal and said first source of energizing potential; a second resistor connected between said input terminal and the base electrode of said first transistor; a third resistor connected between the base electrode of said first transistor and said second source of energizing potential; means connecting the emitter electrode of said first transistor to a point of reference potential; means directly connecting the collector electrode of said first transistor to the base electrode of said second transistor; a fourth resistor connected between the base electrode of said second transistor and said second source of energizing potential; a capacitor connected between ıe base electrode of said second transistor and said oint of reference potential; means connecting the col-:ctor electrode of said second transistor to said second ɔurce of energizing potential; third and fourth tran-istors each having base, emitter and collector elec-:odes; fifth and sixth resistors connected between the mitter electrode of said second transistor and the base lectrodes of said third and fourth transistors, respec-.vely; first and second diodes connected between said oint of reference potential and the base electrodes of aid third and fourth transistors, respectively; seventh nd eighth resistors connected between said first source ıf energizing potential and the base electrodes of said hird and fourth transistors, respectively; means con-.ecting the emitter electrodes of said third and fourth ransistors to said point of reference potential; means or connecting the base electrode of said third transis-or to said first flip-flop circuit output terminal; means or connecting the base electrode of said fourth transis-or to said second flip-flop circuit output terminal; an ıutput terminal; means directly connecting the emitter lectrode of said second transistor to said output ter-ninal; a load having first and second input terminals; neans connecting the collector electrode of said third ransistor to said first load input terminal; and means or connecting the collector electrode of said fourth ransistor to said second load input terminal.

2. The circuit according to claim 1 wherein said load :omprises a write coil having first and second halves con-ıected between said first and second load input terminals, ınd a ninth resistor connected between the junction of the wo halves of said write coil and said second source of :nergizing potential.

3. The circuit according to claim 1 wherein said load :omprises first and second write coils, ninth and tenth esistors connected in series with said first and second vrite coils, respectively, means connecting said first and ;econd write coils to said first and second load input ter-ninals, respectively, means connecting said ninth and :enth resistors to said second source of energizing potential, and second and third capacitors connected in parallel with said ninth and tenth resistors, respectively.

4. The circuit according to claim 1 wherein said load comprises first and second write coils, fifth and sixth resistors connected in series with said first and second write coils, respectively, means connecting said first and second write coils to said first and second load input terminals, respectively, means for connecting said fifth and sixth resistors to said first source of energizing potential, and first and second capacitors connected in parallel with said fifth and sixth resistors, respectively.

5. A current switching circuit comprising a bistable flip-flop circuit; a source of energizing potential; load means having first and second input terminals; first and second switching means operative in response to said flip-flop to transfer current from said energizing potential to said load means; means for respectively connecting said first and second switching means to said first and second input terminals; control signal means; and a control circuit operative in response to said control signal means to permit operation of said flip-flop circuit independent of said first and second switching means.

6. A current switching circuit according to claim 5 in which said control circuit employs a first and a second transistor wherein said first transistor is operative in response to said control signal means to cut off said second transistor, and wherein said second transistor is operative in response to said first transistor to render said first and second switching means inoperative during operation of said flip-flop.

References Cited by the Examiner

UNITED STATES PATENTS

| | | | |
|---|---|---|---|
| 2,846,517 | 8/1958 | Farrand et al. | 179—100.2 |
| 3,042,815 | 7/1962 | Campbell | 307—88.5 |
| 3,167,662 | 1/1965 | Crain | 307—88.5 |

ARTHUR GAUSS, *Primary Examiner.*

D. D. FORRER, *Assistant Examiner.*